United States Patent [19]

Yamashita

[11] Patent Number: 5,401,061
[45] Date of Patent: Mar. 28, 1995

[54] SUCTION PIPE COUPLING MECHANISM FOR VACUUM CLEANER

[75] Inventor: Shusuke Yamashita, Hamamatsu, Japan

[73] Assignee: Azuma Industrial Co., Ltd., Hamamatsu, Japan

[21] Appl. No.: 165,161

[22] Filed: Dec. 10, 1993

[30] Foreign Application Priority Data

Dec. 28, 1992 [JP] Japan .................................. 4-360745

[51] Int. Cl.$^6$ ................................................ F16L 17/02
[52] U.S. Cl. .................................... 285/7; 285/338; 285/351; 285/910
[58] Field of Search ............... 285/7, 338, 910, 196, 285/346, 351, 917

[56] References Cited

U.S. PATENT DOCUMENTS

| 402,600 | 5/1889 | Kemp ........................ 285/338 X |
| 1,657,488 | 1/1928 | Shadden ...................... 285/338 |
| 2,574,109 | 11/1951 | Kane et al. ................. 285/338 X |
| 2,843,400 | 7/1958 | Van Doren ..................... 285/7 |
| 3,986,737 | 10/1976 | Krusche ..................... 285/346 X |
| 4,240,473 | 12/1980 | Leonard ..................... 285/338 X |
| 4,486,002 | 12/1984 | Riess et al. ................ 285/917 X |

FOREIGN PATENT DOCUMENTS 149078 8/1920 United Kingdom ................ 285/346

*Primary Examiner*—Dave W. Arola
*Attorney, Agent, or Firm*—Oblon, Spivak, McClelland, Maier & Neustadt

[57] ABSTRACT

A suction pipe coupling mechanism for vacuum cleaners in which the coupling mechanism is provided with a joint pipe on one of two suction pipes to be coupled with each other. The joint pipe is formed in a size suitable for insertion into the opening at the connecting end of the other or second suction pipe and has an elastic sealing member to be expanded radially outward against the inner periphery of the connecting end of the second suction pipe.

4 Claims, 1 Drawing Sheet

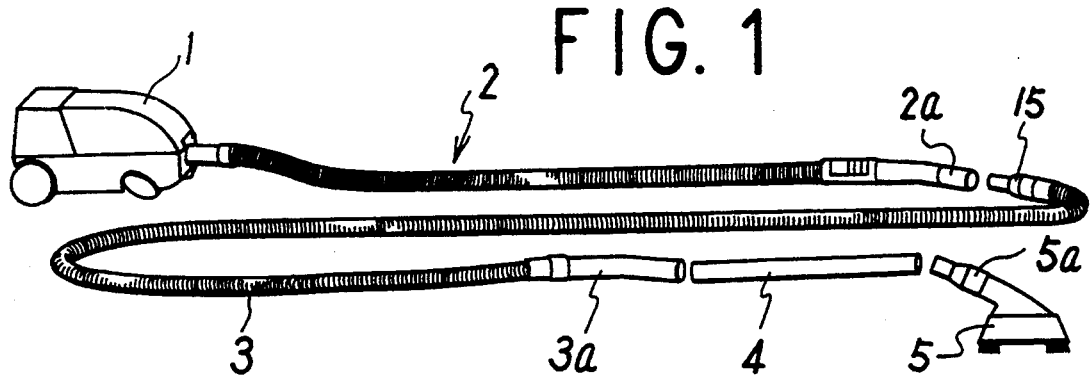
FIG. 1
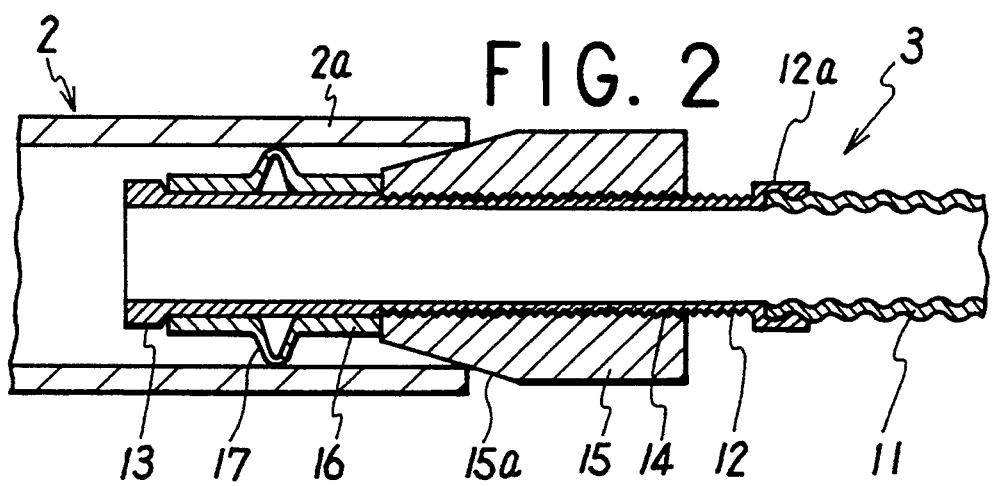
FIG. 2
FIG. 3
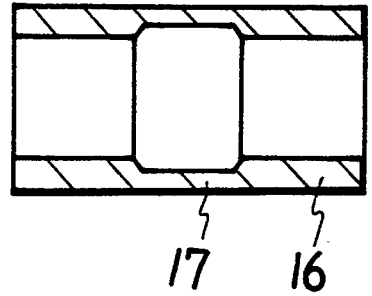
FIG. 4
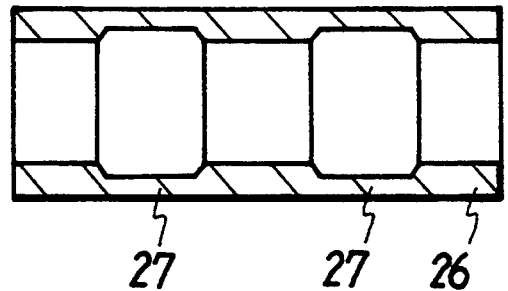

SUCTION PIPE COUPLING MECHANISM FOR VACUUM CLEANER

BACKGROUND OF THE INVENTION

1. Field of the Art

This invention relates to a suction pipe coupling mechanism which can serve as connection means for suction pipes or suction hoses of vacuum cleaners and, for example, which is capable of connecting an extension hose or pipe to the suction hose or pipe of a vacuum cleaner or connecting a vacuuming head to a suction hose in a facilitated manner.

2. Description of the Prior Art

It has been the usual practice for the conventional vacuum cleaners in general use to connect a vacuuming head of a suitable shape to a flexible suction hose, which is connected to a suction port on the cleaner body, directly or through an extension pipe or hose depending upon the nature of the place to be cleaned. The vacuum cleaners of this sort are basically intended for floor cleaning operations, so that more or less the operators feel awkwardness or inconvenience when using them for cleaning ceilings or wall surfaces, mainly due to the shortness of the flexible suction hose which is connected to each cleaner body or of the suction pipe which is connected to the suction hose.

In order to cope with this problem, it is conceivable to provide extension hoses or pipes which are connectible to the above-mentioned suction hose or pipe whenever necessary. However, it is often the case that the suction hoses or suction pipes have different diameters and shapes depending upon the manufacturer or the type of cleaner to which they belong, making it difficult to use optional extension pipes commonly or interchangeably for suction pipes or hoses of various vacuum cleaners.

A similar problem arises when it is desired to use an optional vacuuming head for vacuum cleaners other than the particular type of vacuum cleaner specified for that vacuuming head.

SUMMARY OF THE INVENTION

In consideration of the fact that in most cases the vacuum cleaner suction hoses and pipes commonly have a cylindrical shape on the inner peripheries of the respective connecting ends, it is an object of the present invention to provide a universal suction pipe coupling mechanism which makes it possible to connect various extension pipes or vacuuming heads to a selected vacuum cleaner hermetically in a simplified manner, irrespective of the type of the vacuum cleaner as long as the openings at the connecting ends of the extension pipes or vacuuming heads have a cylindrical shape.

It is another object of the present invention to provide a suction pipe coupling mechanism which is capable of connecting suction pipes with each other securely in a stabilized state free of loosening.

In accordance with the present invention, the above-stated objectives are achieved by the provision of a suction pipe coupling mechanism which essentially includes: a joint pipe provided on one end of a first suction pipe to be connected to a second suction pipe, the joint pipe having an outside diameter suitable for insertion into the opening at a connecting end of the second suction pipe; and a cylindrical sealing member of elastic material fitted on the outer periphery of the joint pipe and having an expansible diameter portion to be spread radially outboard into a larger diameter and pressed against the inner periphery of the second suction pipe when compressed in the axial direction thereof.

Preferably, the above-mentioned sealing member is fitted in a sandwiched state between a stopper projection formed around the outer periphery in a fore end portion of the joint pipe and a cylindrical actuator member threaded on the outer periphery of the joint pipe, and adapted to be compressed in the axial direction between the cylindrical actuator member and the stopper projection when the actuator member is displaced toward the stopper projection by turning the same about the joint pipe.

The expansible diameter portion of the sealing member can be formed by cut-ling off or thinning part of the inner peripheral wall of the sealing member in an annular shape. If desired, a number of such expansible diameter portions may be provided on tile inner periphery of the sealing member at suitable intervals in the axial direction thereof.

For the purpose of coupling the suction pipes in a stabilized state, the actuator member is preferred to have an outside diameter larger than the inside diameter of the connecting end of the second suction pipe, and provided with a tapered fitting portion in its fore end portion on the side of the sealing member, the tapered fitting portion having at the distal end thereof a diameter smaller than the inside diameter of the connecting end of the second suction pipe and being adapted to be brought into abutting engagement with marginal edge portions around the opening of the connecting end portion of the second suction pipe.

BRIEF DESCRIPTION OF THE DRAWINGS

In the accompanying drawings:

FIG. 1 is a schematic view explanatory of a case of connecting an extension pipe to a suction hose of a vacuum cleaner by the use of a suction pipe coupling mechanism according to the present invention;

FIG. 2 is an enlarged sectional view of major component parts of the coupling mechanism shown in FIG. 1;

FIG. 3 is a sectional view of a sealing member employed in the embodiment of FIG. 2; and FIG. 4 is a sectional view of a modification of the sealing member.

PARTICULAR DESCRIPTION OF THE INVENTION

The invention is described more particularly by way of its preferred embodiments with reference to FIGS. 1 through 4. Referring first to FIG. 1, there is exemplified a case where a suction pipe coupling mechanism according to the present invention is used for connecting an extension pipe 3 to the fore end of a suction hose 2 of a vacuum cleaner 1. The opposite or fore end of the extension pipe 3 is connected to a suction pipe 4 which in turn is connected to a vacuuming head 5 at the fore distal end thereof.

As shown particularly in FIG. 2, the extension pipe 3 may be constituted by an extension pipe body 11 in the form of a bellow type hose having at one end thereof a joint pipe 12 with an outside diameter suitable for insertion into the cylindrical opening at the coupling end of a connector pipe 2a which is attached on the fore end of the suction hose 2. The joint pipe 12 is provided with an annular stopper projection 13 around the outer periphery of its fore end portion, and with a screw thread or a male screw portion 14 on the outer periphery of its base end portion. A cylindrical sealing member 16 of an elastic material such as rubber or synthetic resin material is fitted on the outer periphery of the joint pipe 12 between the above-described annular stopper projection 13 and a cylindrical actuator member 15 which is threaded on the male screw portion 14.

The elastic sealing member 16 can be compressed in the axial direction between the actuator member 15 and the annular stopper projection 13 upon turning and displacing the actuator member 15 in the axial direction of the joint pipe 12 toward the annular stopper projection 13, and, when compressed, its expansible diameter portion 17 in its intermediate portion is spread in radially outward directions to increase its diameter thereat. As shown particularly in FIG. 3, the expansible diameter portion 17 with a reduced wall thickness is formed by cutting an annular groove into and around the inner peripheral wall of the sealing member 16 in an intermediate portion thereof.

With the above-described suction pipe coupling mechanism according to the invention, the joint pipe 12 on one end of the extension pipe body 11 is inserted into the coupling end of the connector pipe 2a to which the extension pipe is to be connected, with the actuator member 15 in a retreated position away from the stopper projection 13, namely, with the expansible diameter portion 17 of the sealing member 16 in a flat state. Then, the actuator member 15 is turned and advanced toward the stopper projection 13 to compress the sealing member 16 on the joint pipe 12 in the axial direction, whereupon the expansible diameter portion 17 of the sealing member 16 is spread radially outward through elastic deformation and pressed tightly against the inner periphery of the pipe 2a as shown in FIG. 2 to couple the extension pipe 3 hermetically with the connector pipe 2a.

In this instance, the expansible diameter portion 17 with a reduced wall thickness, which is formed by partly cutting off the inner peripheral wall of the elastic sealing member 16 in an annular shape as described above, can be spread radially outward by very simple means, that is, simply by turning and axially displacing the actuator member 15 in such a way as to compress the sealing member 16 axially against the stopper projection 13. Besides, the expansible diameter portion 15 of the sealing member 16 can be spread at a relatively large expansion rate according to the amount of axial displacement of the actuator member 15, so that it can be tightly pressed against the inner periphery of the pipe 2a to such a degree as to be able, to function as a hermetical seal in an extremely effective manner.

Referring to FIG. 4, there is shown a modification of the above-described elastic sealing member. In this case, the sealing member, which is indicated at 26, is provided with a plural number of expansible diameter portions 27 with a reduced wall thickness at suitable intervals in the axial direction thereof. Therefore, when the sealing member 26 is axially compressed by the actuator member 15, the respective expansible diameter portions 27 are each spread radially outward and pressed tightly against the inner periphery of the pipe 2a at a plural number of positions, hermetically connecting the extension pipe 3 with the connector pipe 2a in a more secure manner.

In case of the sealing member 16 shown in FIG. 3, one expansible diameter portion 17 is pressed against the inner periphery of the pipe 2a, so that it is likely for the joint pipe 12 to rock about the pressed portion. Although such rocking movements of the joint pipe 12 have no possibilities of hindering the cleaning operations or functions of the vacuum cleaner, the joint pipe 23 can be connected in a more stabilized state by the use of the sealing member 26 which is provided with a plural number of expansible diameter portions 27 as shown in FIG. 4 in such a way that the expansible diameter portions 27 are pressed against the inner periphery of the connector pipe 2a at a plural number of separate positions in the axial direction of the pipe.

In case the sealing member 16 as shown in FIG. 3 is employed, for the purpose of stabilizing the coupled state, it is desirable to make the outside diameter of the cylindrical actuator member 15 greater than the inside diameter at the coupling end of the pipe 2a as shown in FIG. 2 and to provide on the circumference of the cylindrical actuator member 15 a fitting portion 15a tapered toward its fore end on the side of the sealing member 16 such that a fore end portion of the tapered fitting portion can be inserted into the connector pipe 2a. With this arrangement, at the time of coupling the extension pipe 3, the expansible diameter portion 17 is pressed against the inner periphery at the coupling end of connector pipe 2, and at the same time the tapered fitting portion 15a is pressed against marginal edge portions of the opening at the coupling end of the pipe 2a, thereby to hold the joint pipe 12 against the connector pipe 2a in a more stabilized state.

In order to couple the joint pipe 12 and the pipe 2a with each other in a stabilized state with the tapered fitting portion 15a in a pressed state against the end of the pipe 2a, firstly the tapered fitting portion 15a is pressed against the fore end of the connector pipe 2a, and in this state the joint pipe 12 is turned relative to the cylindrical actuator member 15 to compress the sealing member 16 in the axial direction, spreading the expansible diameter portion 17 of the sealing member 16 radially outward. By so doing, both of the expansible diameter portion 17 and the fitting portion 15a of the cylindrical actuator member 15 are tightly pressed against the connector pipe 2a to stabilize the coupled state of the joint pipe 12 and the connector pipe 2a. For this operation, it is preferable to connect the joint pipe 12 rotatably to the extension hose 11 at its fore connecting end portion 12a.

As mentioned hereinbefore, considering the fact that in most cases the suction port on a vacuum cleaner body, the suction hose connected to such a suction port on a cleaner body or the suction pipe connected to such a suction hose commonly has a cavity or opening of cylindrical shape at its connecting end, the suction pipe coupling mechanism of the above-described construction according to the invention is arranged to be adaptable to extension pipes of vacuum cleaners of different types, providing a universal type suction pipe coupling mechanism capable of extending suction hoses or pipes of various vacuum cleaners.

In case the above-described suction pipe coupling mechanism is provided on the joint pipe 5a of a vacuuming head 5, it becomes possible to connect the vacuuming head 5a to the connector pipe 3a at the other end of the above-mentioned extension pipe 3 directly or through the suction pipe 4 hermetically in a facilitated manner.

As clear from the foregoing description, the suction pipe coupling mechanism according to the present invention makes it possible to interchangeably connect various extension pipes or vacuuming heads of different vacuum cleaners easily in a secure manner.

What is claimed is:

1. A suction pipe coupling mechanism for vacuum cleaners, comprising:

a joint pipe provide on one end of a first suction pipe to be connected to a second suction pipe, said joint pipe having an outside diameter suitable for insertion into an opening at a connecting fore end of said second suction pipe, an end portion of said joint pipe which is inserted into said opening of said second suction pipe comprising an annular stopper projection formed around an outer periphery of said pipe;

a cylindrical actuator member threadedly mounted on said joint pipe so as to be axially displaceable on the joint pipe, said cylindrical actuator member having a taper shaped fitting portion; and a cylindrical sealing member of elastic material fitted on the outer periphery of said joint pipe between said cylindrical actuator member and said annular stopper projection, said cylindrical sealing member being provided with an expansible diameter portion, wherein a displacement of said cylindrical actuator member against said cylindrical sealing member causes said cylindrical sealing member to press against said annular stopper projection to compress said cylindrical sealing member between said annular stopper projection and said cylindrical actuator member, to thereby cause said expansible diameter portion of cylindrical sealing member to be spread radially outward into a larger diameter and pressed against an inner periphery of said second suction pipe;

wherein said cylindrical actuator member is arranged to have an outside diameter larger than an inside diameter of the connecting fore end of said second suction pipe, and provided with said tapered fitting portion in a fore end portion on a side of said sealing member, said tapered fitting portion having at a distal end thereof a diameter smaller than the inside diameter of the connecting fore end of said second suction pipe and being adapted to be brought into abutting engagement with marginal edge portions around the opening at the connecting fore end of said second suction pipe when said first and second suction pipes are coupled with each other, to thereby stabilize the coupling of said first and second suction pipes.

2. A suction pipe coupling mechanism as defined in claim 1, wherein said expansible diameter portion of said sealing member is formed by thinning part of a wall of said cylindrical sealing member in an annular shape on a side of an inner periphery thereof.

3. A suction pipe coupling mechanism as defined in claim 2, wherein said expansible diameter portion is provided at a plural number of positions on said sealing member at suitable intervals in the axial direction thereof.

4. A suction pipe coupling mechanism for vacuum cleaners, comprising:

a joint pipe provided on one end of a first suction pipe for connection to a second suction pipe, said joint pipe having an outside diameter suitable for insertion into an opening at a connecting fore end of said suction pipe, an end portion of said joint pipe which is inserted into said opening of said second suction pipe comprising an annular stopper projection formed around an outer periphery of said joint pipe;

a cylindrical actuator member threadedly mounted on said joint pipe so as to be axially displaceable on said joint pipe, said cylindrical actuator member having a taper shaped fitting portion; and a cylindrical sealing member of an elastic material fitted on the outer periphery of said joint pipe between said cylindrical actuator member and said annular stopper member, said cylindrical sealing member comprising an expansible diameter portion such that a displacement of said cylindrical actuator member so as to press an end portion of said taper shaped fitting portion against said cylindrical sealing member causes said cylindrical sealing member to press against said annular stopper projection to compress said cylindrical sealing member between said annular stopper projection and said cylindrical actuator member, to thereby cause said expansible diameter portion of said cylindrical sealing member to be spread radially outward against an inner periphery of said second suction pipe;

and said taper shaped fitting portion is sized intermediate the ends of the taper to engage marginal edge portions around the opening at the connecting fore end of said second suction pipe when said first and second suction pipes are coupled to each other to thereby stabilize the coupling of said first and second suction pipes.

* * * * *